(12) United States Patent
He et al.

(10) Patent No.: US 7,092,395 B2
(45) Date of Patent: Aug. 15, 2006

(54) CONNECTION ADMISSION CONTROL AND ROUTING BY ALLOCATING RESOURCES IN NETWORK NODES

(75) Inventors: Linhai He, Berkeley, CA (US); Albert Kai-sun Wong, Ma On Shan (HK)

(73) Assignee: Lucent Technologies Inc., Murray Hill, NJ (US)

( * ) Notice: Subject to any disclaimer, the term of this patent is extended or adjusted under 35 U.S.C. 154(b) by 45 days.

(21) Appl. No.: 10/668,539

(22) Filed: Sep. 23, 2003

(65) Prior Publication Data
US 2004/0066785 A1 Apr. 8, 2004

Related U.S. Application Data

(63) Continuation of application No. 09/264,834, filed on Mar. 8, 1999.

(60) Provisional application No. 60/077,254, filed on Mar. 9, 1998.

(51) Int. Cl.
*H04L 12/56* (2006.01)
(52) U.S. Cl. .................... 370/395.2; 370/412
(58) Field of Classification Search ............ 370/229, 370/230, 232, 241, 253, 351, 389, 395.1, 370/395.74, 395.42, 395.43, 395.72, 400, 370/409, 412, 417, 395.2, 395.21; 709/213
See application file for complete search history.

(56) References Cited

U.S. PATENT DOCUMENTS

| | | | | |
|---|---|---|---|---|
| 5,757,771 A | * | 5/1998 | Li et al. | ..................... 370/235 |
| 5,838,663 A | | 11/1998 | Elwalid et al. | |
| 5,909,547 A | * | 6/1999 | Mitra | ......................... 709/213 |

(Continued)

OTHER PUBLICATIONS

R. Bolla et al., "Bandwidth Allocation and Admission Control in ATM Networks with Service Separation," IEEE Communications Magazine, 130-37 (May 1997).

(Continued)

*Primary Examiner*—Derrick Ferris

(57) ABSTRACT

A method and apparatus regulate the admission control of, and requests for routing of, virtual circuits in a network by determining network resource requirements for the virtual circuits. The method is generalized for the shared-memory architecture of a network node, to allocate a buffer size value, $B_i$, to an output port, i, for use in the effective bandwidth computation. A static allocation policy is utilized to allocate the available buffer, $B_{SMF}$, to each output port, i. The allocated buffer is determined by selecting a value from a range having a lower bound obtained by partitioning the buffer, $B_{SMF}$, to evenly divide the buffer space among all the output ports, such that $$\sum_i B_i = B_{SMF};$$

and having an upper bound obtained by using the total available buffer, $B_{SMF}$, for each port in their computation of effective bandwidths. The network resource requirements are based on a set of parameters used to control the flow of information from a communications device onto the virtual circuit. The requirements for network resources typically include buffer space requirements in network nodes and bandwidth requirements in network links, and the parameter used to control the flow of information are those associated with an access regulator, such as a leaky bucket regulator (LBR). The network resource determination is made for the case where lossless performance in the network is required and in the case where statistical multiplexing with limited loss is allowed.

23 Claims, 6 Drawing Sheets

U.S. PATENT DOCUMENTS 6,028,840 A * 2/2000 Worster .................. 370/230

OTHER PUBLICATIONS

A. Elwalid et al. "A New Approach for Allocating Buffers and Bandwidth to Heterogeneous, Regulated Traffic in an ATM Node," IEEE J. on Selected Areas in Communications, vol. 13, No. 6, 115-1127 (Aug. 1995).

H.G. Perros and K.M. Elsayed, "Call Admission Control Schemes: A Review," IEEE Communications Magazine, 82-91 (Nov. 1996).

G.L. Wu and J.W. Mark, "A Buffer Allocation Scheme for ATM Networks: Complete Sharing Based on Virtual Partition," IEEE/ACM Trans. on Networking, vol. 3, No. 6 (Dec. 1995).

* cited by examiner

CONNECTION ADMISSION CONTROL AND ROUTING BY ALLOCATING RESOURCES IN NETWORK NODES

CROSS REFERENCE TO RELATED APPLICATIONS

This application claims the benefit of U.S. Provisional Application No. 60/077,254, filed Mar. 9, 1998 and is a continuation of U.S. patent application Ser. No. 09/264,834, filed on Mar. 8, 1999.

FIELD OF THE INVENTION

The present invention relates to a network communication system, and more particularly, to the admission control of requests for, and routing of, virtual circuits by allocating network resources.

BACKGROUND OF THE INVENTION

Networks are a principal means of exchanging or transferring information, such as data, voice, text or video information, among communication devices, such as computer terminals, multimedia workstations, and videophones, connected to the networks. A network typically comprises switching nodes connected to each other, and to communication devices, by various links. Each link is characterized by a bandwidth or link capacity. Information input from the communication devices to the network may be of any form but is often formatted into fixed-length packets or cells.

When information is to be exchanged between two communication devices, a path, often referred to as a "virtual circuit" (VC), is established. The virtual circuit is comprised of a set of nodes and links connecting the two communication devices. One of the communication devices specifies the destination for the information, and the network delivers the information over the virtual circuit as though a dedicated circuit connected the two communication devices. Cells in transit between communication devices may temporarily be stored in buffers at nodes along the path of the virtual circuit pending sufficient available bandwidth on subsequent links along the path.

An important consideration in network operation is admission control and routing of virtual circuits. Admission control is the process of deciding whether or not to admit requests for establishing new virtual circuits in the network. Routing is the process of selecting a path through the network for the requested virtual circuit. In particular, the task is to determine which VC requests the network can admit and route. The admission and routing determination may take into account various factors, such as the network topology, current available network resources, and any quality-of-service commitments, such as guaranteed bandwidth or maximum cell loss probability, made to users of the network. The availability of network resources requires sufficient buffer space in the nodes and capacity in the links.

The admission control and routing problems are typically addressed together. For example, when a network receives a request to establish a virtual circuit between communication devices, the network may initially select, based on a first criterion, a set of potential paths on which the requested virtual circuit may be routed. One such first criterion is to select, as the set of potential paths, all possible paths between the communication devices passing through less than a specified number of nodes. The network will then route the virtual circuit request on a path in the set of potential paths according to a second criterion, for example, the virtual circuit will be routed on the path whose most heavily utilized link operates at the smallest percentage of its capacity. If no paths are in the set of potential paths or if no paths meet the second criterion, then the requested virtual circuit is not admitted.

The admission control/routing problem is complicated when a variable bit-rate (VBR) source or communications device seeks access to the network and requests a virtual circuit. The complication arises because the statistics which describe the variations in the information input from the VBR source to the network are often imprecise and thus it is difficult to predict the requirements for network resources, such as requirements for buffer space in network nodes and requirements for bandwidth or capacity in network links. For example, the bandwidth requirements of VBR sources typically vary with time, and the bandwidth variations typically are difficult to characterize. Thus, the admission/routing determination is made with information that may not accurately reflect the demands that the VBR source may place on the network thereby causing degraded network performance. More particularly, if the network resource requirements for a VBR source requesting a virtual circuit through the network are overestimated based on inaccurate characterizations of the VBR source, then the network will not run at full capacity in that a portion of the resources provided or allocated to the VBR source based on the estimate will frequently not be used. Alternatively, if network resources are underestimated, the VBR source will input more information to the network than the network had provided for, and thus the network may become congested and cells traversing the network may be lost. See, for example, Roch Guerin et al., "Equivalent Capacity and its Application to Bandwidth Allocation in High-Speed Networks," IEEE J. Sel. Areas in Comm., Vol. 9, No. 7, pp. 968–981 (September 1991).

A method has been proposed for determining the network resources required by requests for virtual circuits and for using the resource requirements in the process of admitting and routing the virtual circuit requests. See, A. Elwalid, D, Mitra and R. Wentworth, "A new approach for allocating buffers and bandwidth to heterogeneous, regulated traffic in an ATM node," IEEE J. Select. Areas. Commun., vol. 13, pp. 1115–1127 (1995) and U.S. Pat. No. 5,838,663, assigned to the assignee of the present invention, each incorporated by reference herein. The Elwalid method takes advantage of the statistical multiplexing effect of large buffers. The Elwalid method uses a two-phase approach for solving the two-resource (buffer space in the nodes and capacity in the links) allocation problem.

Generally, in the first phase, lossless multiplexing is considered, and a buffer-capacity allocation policy is used to make the two resources exchangeable, thus making the two-resource problem a single-resource problem. In the second phase, the effect of statistical multiplexing is analyzed for the single-resource system by using established techniques. The Elwalid method is based on a model of a multiplexer having a dedicated buffer and bandwidth for a plurality of inputs and a single output. More commonly, however, the buffer is shared by all the output ports. Thus, a need exists for a method and apparatus that determines the network resources required by requests for virtual circuits and for using the resource requirements in the process of admitting and routing the virtual circuit requests in a network environment where the buffer is shared by all the output ports.

SUMMARY OF THE INVENTION

Generally, according to one aspect of the invention, a method and apparatus are disclosed for determining the network resources required by a request from a communications device for a virtual circuit through a network, and for using the resource requirements in the process of admitting and routing the virtual circuit requests. The network comprises nodes and links, and the network resource requirements are determined based on a set of parameters used to control the flow or rate of information from the communications device into the network and onto the virtual circuit. The requirements for network resources advantageously include buffer space requirements in network nodes and bandwidth requirements in network links. The set of parameters advantageously characterize a function for controlling the flow of information from the device into the network, such as the type of function performed by an access regulator. The determined network resource requirements may then be used in deciding whether to admit and how to route the requested virtual circuit in the network.

According to a feature of the present invention, an algorithm for determining the network resources required by requests for virtual circuits and for using the resource requirements in the process of admitting and routing the virtual circuit requests is generalized for the shared-memory architecture of a network node, to allocate a buffer size value, $B_i$, to an output port, i, for use in the effective bandwidth computation. The present invention utilizes a static allocation policy to allocate the available buffer, $B_{SMF}$, to each output port, i. In one implementation, the buffer is allocated to each port by selecting a value from a given range. The range utilizes a lower bound obtained by partitioning the buffer, $B_{SMF}$, to evenly divide the buffer space among all the output ports, such that $$\sum_i B_i = B_{SMF},$$

and an upper bound obtained by sharing the total available buffer, $B_{SMF}$, among all the ports.

A more complete understanding of the present invention, as well as further features and advantages of the present invention, will be obtained by reference to the following detailed description and drawings.

DETAILED DESCRIPTION

Figure 1:
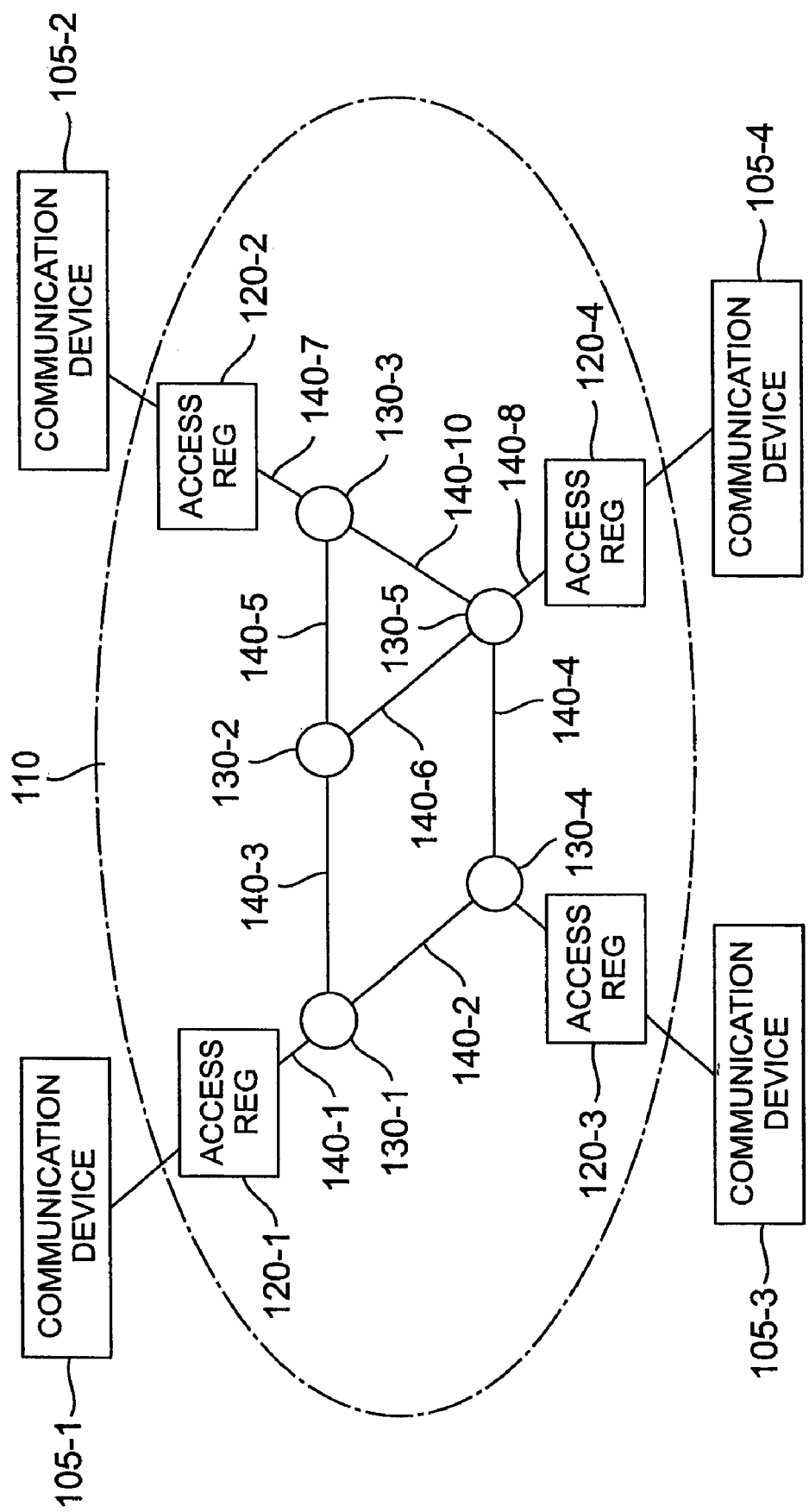
FIG. 1 illustrates a network environment in which the present invention may be implemented.

FIG. 1 illustrates a network in which the inventive method for admission control and routing of requests for virtual circuits based on network resources required by the request may be practiced. Network 110 comprises switching nodes 130-i and links 140-k. Each communication device 105-j has associated with it devices, such as access regulators 120-j, which regulate the flow or rate of information from communication device 105-j into network 110 according to a function characterized by a set of (access regulator) parameters.

For illustrative purposes, access regulator 120-j will be considered to be a leaky bucket regulator. However, other types of regulators, such as buffered leaky bucket regulators or cascaded leaky bucket regulators, may be used. Each communication device 105-j generates information, such as data, text, voice or video, for use by, or receives information from, other communication devices in the network. Information from communication device 105-j is characterized by a set of information parameters such as long term average transmission rate, r, peak rate, P, and maximum burst size, $B_T$. The value of each information parameter in the set of information parameters is advantageously determined, for example, by contracting with the network for a maximum cell loss rate (CLR) and for appropriate access regulator parameters, for example, the rate at which information flows into the network from a device depends on the parameters of the access regulator which access regulator is advantageously a part of the network. For illustrative purposes, communication device 105-j includes apparatus, such as analog-to-digital converters, so as to render the information suitable for transmission on network 110.

Network Architecture

Figure 2:
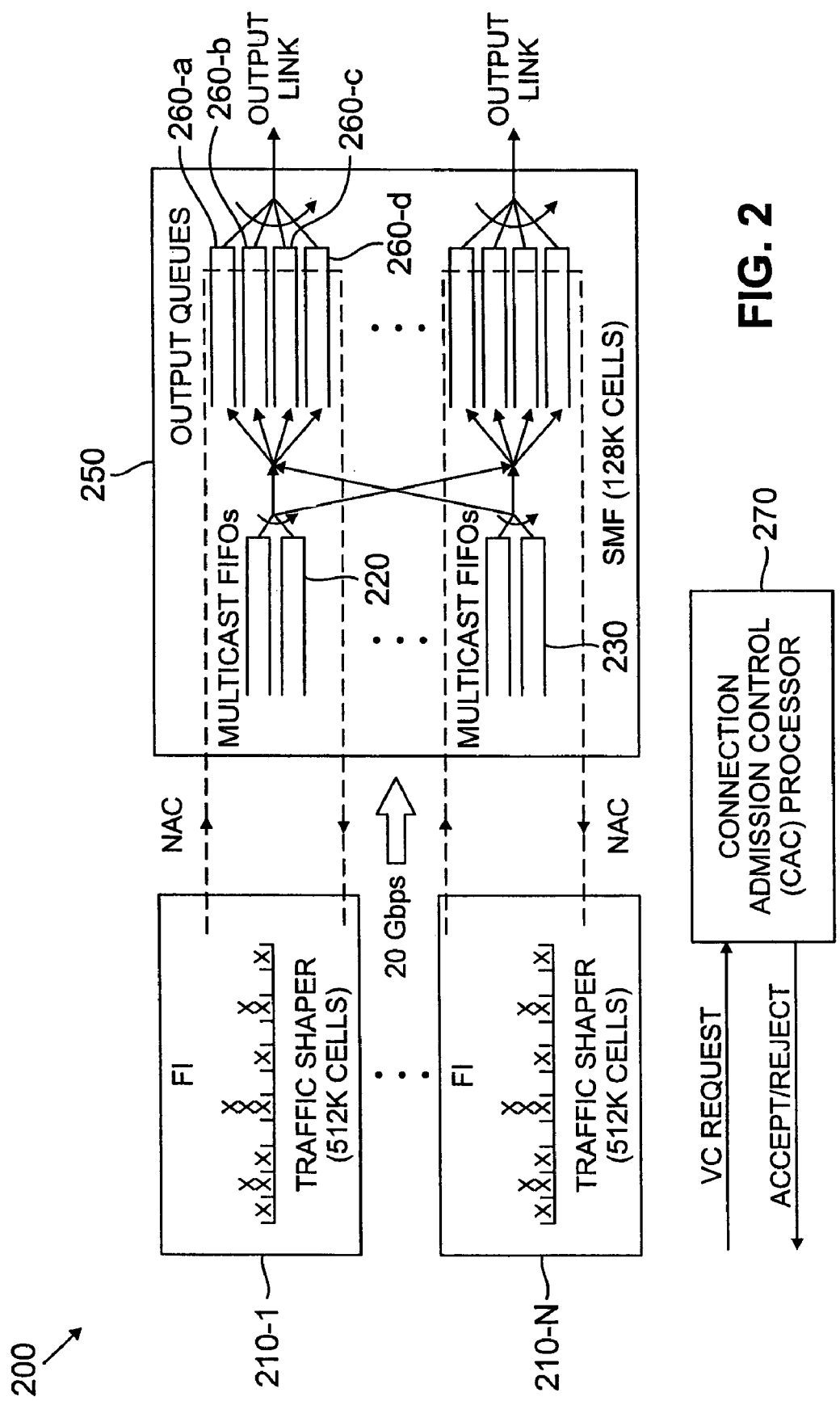
FIG. 2 is a schematic block diagram of a network node of FIG. 1.

FIG. 2 illustrates a representative architecture for a node 200 in the network 110. As shown in FIG. 2, the node switching fabric consists of two major components: a single-stage shared-memory fabric (SMF) 250 with a buffer fully shared among all output ports, and a plurality of fabric interfaces (FI) 210-N each having a cell buffer used for ingress buffering and traffic shaping. In addition, to provide point-to-multiple points service, the node 200 may include two multicast first-in-first-out (FIFO) queues 220, 230 at the input to the SMF. The two FIFO queues 220, 230 are served with a strict-priority policy and are drained in the illustrative embodiment at the rate of 20 Giga-bits-per-second (Gbps). The ingress buffers 210-N, the multicast FIFOs 220, 230, and the SMF 250 constitute the three main queueing points in the network 110. In addition, as shown in FIG. 2, the node 200 includes a connection admission control (CAC) processor 270, that receives requests for a virtual circuit, and processes the request in accordance with the present invention to determine whether the request should be accepted or rejected.

Delay priority control in the network 110 is provided primarily by the SMF 250, which supports four delay priority queues 260a–d for each output port. Each delay priority queue 260 is implemented as a FIFO, and the four delay priority queues 260 are served with the exhaustive strict priority policy. In other words, a lower delay priority queue is not served unless all higher priority queues are empty. The mapping of five illustrative service classes to these four delay priority levels is as follows (in decreasing priority): Constant-Bit-Rate (CBR), real-time and non-real-time Variable-Bit-Rate (rt-VBR and nrt-VBR) together with available-bit-rate (ABR) and unspecified-bit-rate (UBR) services.

The cell loss priority of a cell in the network 110 is determined by a combination of the standard Cell Loss Priority (CLP) bit indicated in the cell, an internal Virtual Connection Loss Priority (VLP) bit that is marked and provisioned internally on a per-connection basis, and the knowledge of the delay class that the cell belongs to. In the SMF 250, upon the arrival of a cell, four static thresholds and a similar set of dynamic thresholds are compared against the current destination port queue length and the destination port delay priority queue length. Based on the result of this comparison and the CLP/VLP/delay-class combination of the arriving cell, a decision is made as to whether this cell should be admitted into the buffer or dropped. For a more detailed discussion of the dynamic threshold algorithm, which ensures fair sharing of buffer across all the output ports, see, for example, A. K. Choudhury, E. L. Hahne, "Dynamic Queue Length Thresholds For Multiple Priority Traffic," in Proc. ITC-15, V. Ramaswami and P. E. Wirth, Eds., pp. 561–571 (New York: Elsevier, 1997). Since the dynamic thresholds algorithm works in such a way that only CBR cells will be admitted into the SMF 250 when the SMF 250 is running low on buffer space, CBR cells are virtually guaranteed no loss in the system 110. Static thresholds based on the CLP bit and the VLP bit are also supported in the shaping buffer in the ingress FI's 210.

As previously indicated, the pressure transducer 110 supports ingress traffic shaping with a pair of fabric interfaces 210-N having a cell buffer used for ingress buffering and traffic shaping. The traffic shaper, with a time-bin implementation of the calendar queue, regulates cell admission into the SMF 250 according to the standard Generic Cell Rate Algorithm (GCRA) (for example, the standard leaky-bucket regulator) on a per-connection basis. For a more detailed discussion of a time-bin implementation of the calendar queue and the Generic Cell Rate Algorithm, see, for example, J. Rexford et al., "Scalable Architectures for Traffic Shaping and Link Scheduling in High-Speed ATM Networks," IEEE J. Select. Areas Commun. (June 1997) and ATM Forum Technical Committee, "Traffic Management Specification," version 4.0, the ATM Forum, Foster City, Calif. (1995).

The traffic shaping function can be provisioned, on a per-connection basis, to operate in either the static or dynamic mode. While the shaping rate is fixed in the static mode, it is constantly adjusted in the dynamic mode. The static mode, intended for VBR connections, serves to undo the burstiness that can be accumulated as each connection travels across the network 110. The dynamic mode, intended for ABR and UBR connections, employs a scheme referred to as Node Access Control (NAC) to slow down or speed up the admission of cells into the SMF 250 based on the current congestion state of the associated output queues. Using per-connection periodic binary feedback from output to input, the NAC scheme adjusts each connection's shaping rate upward or downward in a manner similar to the standard ABR binary mode algorithm. In this manner, the traffic shaper serves as a dynamic front-end regulator with a large buffer that protects the SMF 250 from potential buffer overflow. In the case of ABR traffic, the dynamic traffic shaper will also respond to the allowed cell rate indicated in the standard backward resource management (RM) cells, thus speeding up the response of the ABR control loop as perceived by the downstream switches.

Admission Control and Routing Algorithm for VBR Class

The connection admission control algorithm disclosed herein is based on the concept of effective bandwidth. As indicated above, rhe VBR service class consists of two sub-classes: nrt-Variable Bit-Rate and real-time time Variable-Bit-Rate (rt-VBR). The nrt-VBR sub-class is intended for applications that are bursty and require low cell loss rates (such as high-speed file transfer), and the rt-VBR sub-class is intended for applications that have requirements on the cell delay and delay variation (CDV) in addition to the cell loss rate (such as variable-rate real-time video). Thus, a VBR connection is characterized by its Peak Cell Rate (PCR), Sustained Cell rate (SCR,) and Maximum Burst Size (MBS). In addition, the VBR quality of service (QoS) contract includes a Cell Loss Rate for both nrt-VBR and rt-VBR, as well as a Cell Delay Variation for rt-VBR.

The connection admission control algorithm disclosed herein utilizes the Peak Cell Rate, Sustained Cell rate, and Maximum Burst Size parameters and the amount of available network resources to determine the bandwidth and buffer allocation for a given virtual circuit request, so that the required Cell Loss Rate can be guaranteed. The allocated bandwidth, usually referred to as the effective bandwidth, presents the minimum amount of bandwidth required by a connection in order to obtain the requested quality of service. Generally, the allocation of effective bandwidth should take advantage of the bursty nature of VBR sources and statistical multiplexing.

A number of algorithms have been proposed with different approaches to the problem. However, many of the proposes approaches model ATM switches as a bufferless multiplexer. Such single-resource approaches, however, can result in very conservative bandwidth allocation and low system utilization for switches with large buffers. As previously indicated, A. Elwalid et al. developed a novel effective bandwidth algorithm that takes advantage of the statistical multiplexing effect of large buffers. See, A. Elwalid, D, Mitra and R. Wentworth, "A new approach for allocating buffers and bandwidth to heterogeneous, regulated traffic in an ATM node," IEEE J. Select. Areas. Commun., vol. 13, pp. 1115–1127 (1995) and U.S. Pat. No. 5,838,663, incorporated by reference herein.

Generally, the Elwalid algorithm uses a two-phase approach for solving the two-resource (i.e. bandwidth and buffer) allocation problem. In the first phase, lossless multiplexing is considered, and a buffer-capacity allocation policy is used to make the two resources (i.e. bandwidth and buffer) exchangeable. The first step reduces the original two-resource problem to a single-resource problem and leads to the concept of lossless effective bandwidth. In the second phase, the effect of statistical multiplexing is analyzed for the single-resource system by using established techniques such as Chernoff large derivations approximation.

First Phase

Figure 3:
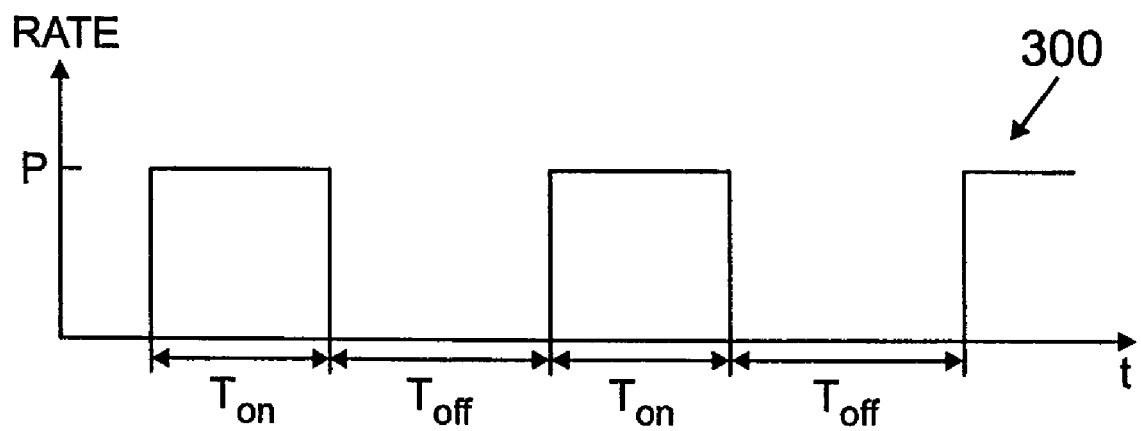
FIG. 3 illustrates a periodic, on-off process of information departing from a regulator of FIG. 1.

The system model used by the Elwalid algorithm is an ATM multiplexer, having a buffer size, B, capacity C, and dual leaky-bucket regulated input traffic sources, each specified by parameters (P, r, $B_T$) where P bounds the peak cell rate, r bounds the average cell rate, and $B_T$ is the token buffer size of the regulator. In addition, the system model assumes that the output of the traffic regulators 120-$j$ are extremal, periodic ON/OFF processes with independent, uniformly distributed random phases. These processes are extremal in the sense that all cells in an active period arrive in the rate of Peak Cell Rate, as shown in FIG. 3. FIG. 3 illustrates the rate process 300 that is the output of the access regulators 120-$j$. As shown in FIG. 3, $$T_{ON} = \frac{B_T}{P-r} \text{ and } T_{OFF} = \frac{B_T}{r} \qquad \text{Eq. (1)}$$

Extremal, periodic ON/OFF processes have been shown to be the worst-case traffic in maximizing the Chernoff approximation in estimating Cell Loss Rate for a bufferless system. See, D. Mitra and J. A. Morrison, "Multiple time-scale regulation and worst-case processes for ATM network control", in Proc. 34th Conf. on Decision and Control, 353–358 (1995). The resulting estimation of Cell Loss Rate should be very conservative if not the worst case. In addition, even if they are not the worst case, the resulting difference in the derived effective bandwidth should not be significant.

Figure 4:
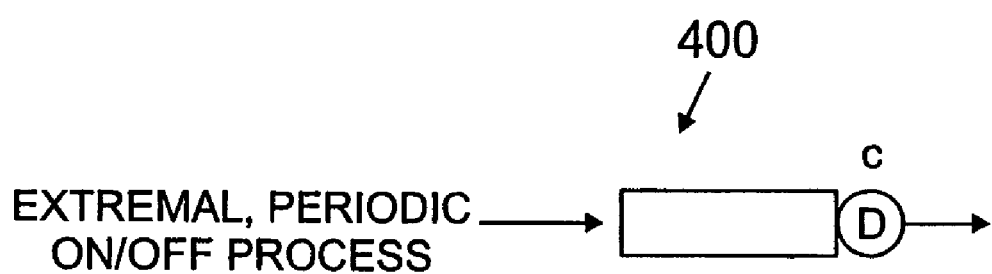
FIG. 4 illustrates the buffer content and utilized bandwidth for a virtual system for a single source.
Figure 5:
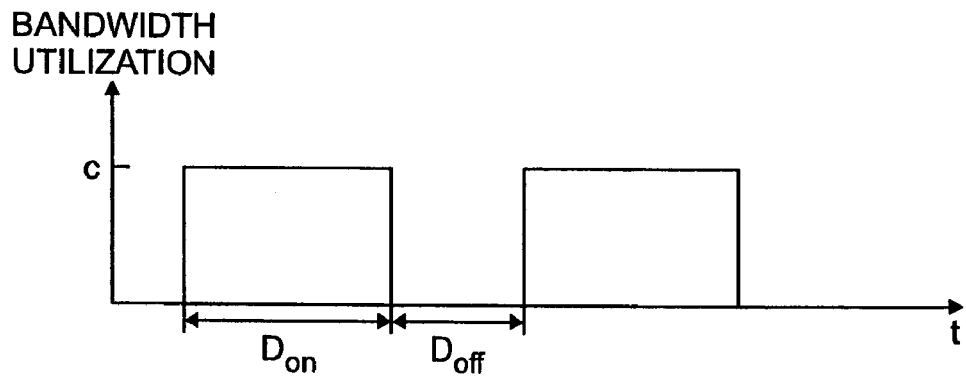
FIG. 5 illustrates the bandwidth utilization process, Ui(t) for a virtual system for a single source.
Figure 6:
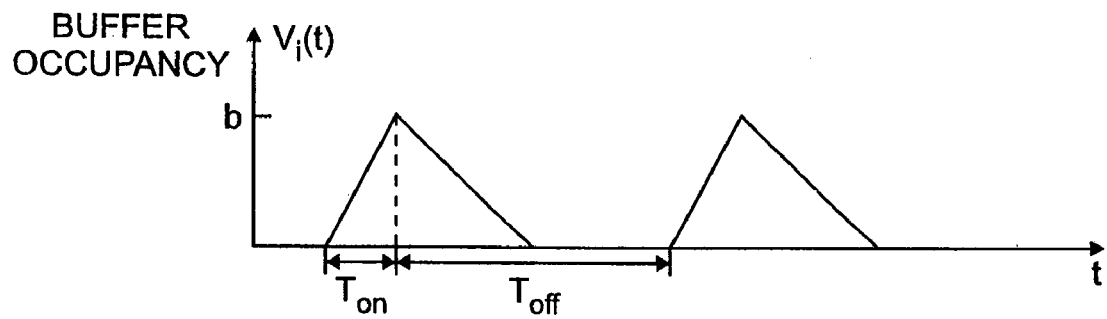
FIG. 6 illustrates the buffer occupancy process, Vi(t) for a virtual system for a single source.

As shown in FIG. 4, the aggregate bandwidth utilization and queue occupancy processes can be decomposed into individual virtual buffer/trunk systems 400 corresponding to the individual connections. Each of these virtual trunk/buffer systems is allocated a bandwidth of $c_i$, and its arrival process is a single extremal, periodic ON/OFF process specified by the triple (P, r, $B_T$), as shown in FIG. 3. The resulting bandwidth utilization process, $U_i(t)$, shown in FIG. 5, and buffer occupancy process, $V_i(t)$, shown in FIG. 6, are also periodic ON/OFF processes. It can be shown that $b_i$, the peak value of $V_i(t)$, is a linear function of the allocated bandwidth, $c_i$:

$$b_i = \frac{B_T P}{P-r}\left(1 - \frac{c_i}{P}\right)$$

The key question in the first phase is how to select $c_i$, which is a free variable within the range of [r, P], for each connection so that both the aggregated bandwidth utilization process and the buffer occupancy process can meet their constraints, i.e.

$$\Sigma_i c_i \leq C \text{ and } \Sigma_i b_i \leq B,$$

to achieve lossless performance. The question can be treated as a two-constraint optimization problem and solved for the set of $c_i$'s. This solution, however, depends strongly on the given traffic mix, and whenever there is a change in the traffic mix, $c_i$'s must be re-computed. In addition, this optimization procedure is computationally expensive. Thus, this approach cannot be efficiently used in a real-time connection admission control designs, and the selection of $c_i$'s should be made independent of the characteristics of other sources. Elwalid et al. argue that it would require each connection to use the same policy to determine its $c_i$ based on its own traffic parameters in such a way that both resources, buffer, B, and bandwidth, C, are always exhausted at the same time. This condition occurs only if, i.e. the ratio of the resources allocated to each individual virtual buffer/trunk system 400 is proportional to that of the system resource.

Figure 7:
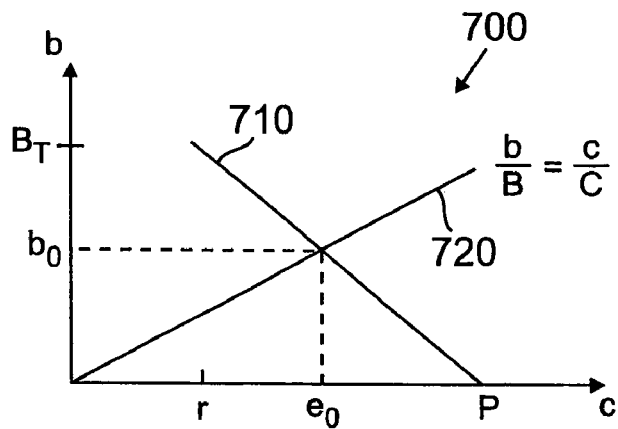
FIG. 7 illustrates the determination of the buffer space requirement and effective bandwidth.

Since $b_i$ is a linear function of $c_i$, such a policy produces a unique solution of $c_i$ for each connection, as depicted in FIG. 7. FIG. 7 illustrates the determination of the lossless effective bandwidth, $e_0$. This unique solution, denoted by $e_0$, is the lossless effective bandwidth of the connection, justified by the fact that the system 110 would experience no cell loss at all if the bandwidth allocated to each admitted connection equals $e_0$, which may be expressed as follows:

$$e_0 = \frac{P}{1 + \frac{B}{C}\frac{(P-r)}{B_T}}$$

An exception to this procedure occurs when there is no intersection between the two straight lines 710, 720 in the plot 700, in which case a natural choice for $c_i$ is r, with a corresponding buffer allocation of rB/C to keep the allocation policy consistent for each connection.

Second Phase

In the second phase of the algorithm, a very small cell loss probability is allowed, to extract statistical multiplexing gain from the time-varying un-utilized portions of the resources allocated to the connections. The constraints now become:

$$P_r\left[\sum_i U_i(t) \geq C\right] \leq CLR \text{ and } P_r\left[\sum_i V_i(t) \geq B\right] \leq CLR$$

Now, unlike in the first phase, these two constraints are not exchangeable because of the difference in the distributions of $U_i(t)$ and $V_i(t)$. To simplify the analysis, $V_i(t)$ can be conservatively bounded by an ON/OFF process (a square wave-like $U_i(t)$) with a peak value of $b_0 = e_0 B/C$ during ON periods. Since $U_i(t)$ and $V_i(t)$ processes are synchronized, this simplification makes $U_i(t)$ and $V_i(t)$ equivalent once again. Hence, only one constraint needs to be considered and the problem is reduced to be the same as the Cell Loss Rate estimation problem for a bufferless system. Using a large deviation approximation, one can show that:

$$P_r\left[\sum_i U_i(t) \geq C\right] - \exp(-F_K(s^*)), \text{ where} \qquad \text{Eq. (2)}$$

$$F_K(s^*) = \sup_{s\geq 0}\left\{sC - \sum_{j=1}^{j} K_j \ln\left(1 - \frac{r_j}{e_{0,j}} + \frac{r_j}{e_{0,j}}e^{se_{0,j}}\right)\right\},$$

where J is the number of different traffic types and $K_j$ is the number of connections that belong to the traffic type j. In the homogeneous case, where all connections are of the same traffic type, the lossy effective bandwidth $e_1$ of that traffic type can be defined as $C/K_{max}$, where $K_{max}$ is the maximum value of K that satisfies the inequality:

$$P_r\left[\sum_i^K U_i(t) \geq C\right] \leq CLR.$$

The bandwidth is a "lossy effective bandwidth" in the sense that if the admission decision is performed based on $$\sum_i e_{l,i} \le C,$$

cell loss will be bounded by the given Cell Loss Rate. Similarly, the lossy effective buffer of a traffic type $b_l$ can be defined by $b_l = e_l \cdot B/C$, because of the proportional buffer/bandwidth allocation policy.

In addition, by analyzing the properties of $F_K(S^*)$, it can be shown that there is an important quantity associated with a traffic type, named the critical bandwidth, $C_c$, that determines whether or not statistical multiplexing gain can be obtained. In a homogeneous system, if C is larger than the critical bandwidth, $C_c$, of that traffic type, then a statistical multiplexing gain greater than unity can be achieved; otherwise, no more connections can be admitted than what is determined by lossless allocation. Therefore, by comparing the critical bandwidth, $C_c$, of a traffic type to the system bandwidth, C, one can classify the traffic type as either statistically multiplexable (S-VBR) or non-statistically multiplexable (NS-VBR).

Figure 8A:
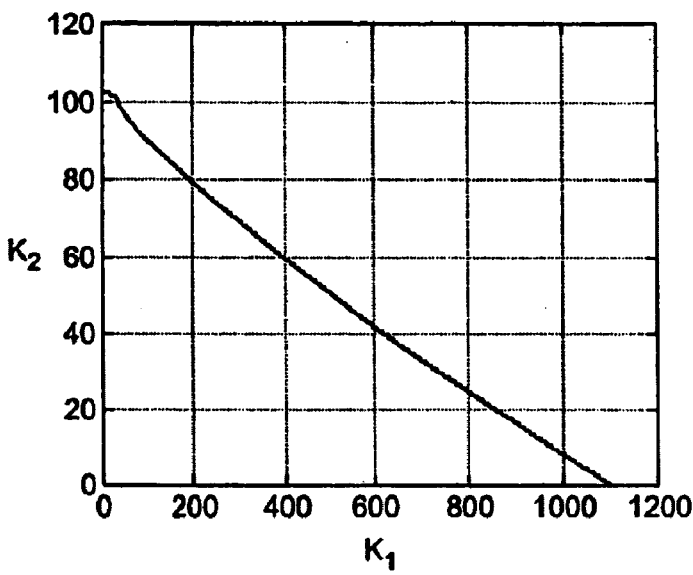
FIG. 8A shows the admission region for the multiplexing of two different types of S-VBR connections.
Figure 8B:
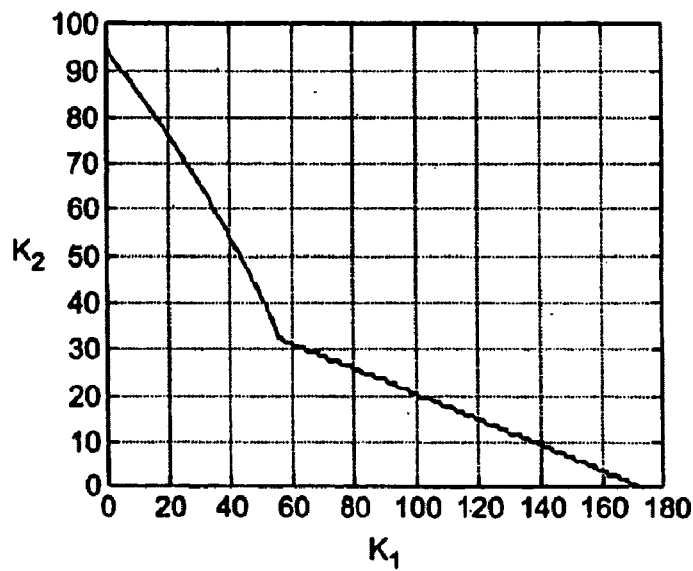
FIG. 8B shows the admission region for the multiplexing of one NS-VBR type of connection with one S-VBR type of connection.

Through numerical investigation, Elwalid et al., referenced above, have shown that if connections of the same property (in other words, either are all S-VBR or are all NS-VBR) are multiplexed, the admission region boundary is almost linear. On the other hand, when S-VBR and NS-VBR connections are multiplexed together, the admission region boundary is nonlinear but composed of piece-wise linear segments. FIG. 8 shows the admission region for the multiplexing of two traffic types. Both plots in FIG. 8 are generated for a system with a 5,000 cell buffer, 155 Mbps link capacity, and a target Cell Loss Rate of $10^{-9}$. Specifically FIG. 8A shows the admission region when two different types of S-VBR connections are multiplexed, and FIG. 8B shows the admission region when one NS-VBR type of connections are multiplexed with one S-VBR type of connections. The traffic parameters for the types of the connections in these two cases are indicated in FIG. 8.

These results have important practical implications for the connection admission control design. The linearity of the admission region boundaries implies that the connection admission control can define the effective bandwidth for each traffic type independently from the others. Further, in implementation, effective bandwidths can then be pre-computed for a set of pre-defined traffic types and stored in a table instead of being computed in real-time by numerically solving equation (2). As long as the S-VBR and NS-VBR traffic types are not multiplexed together, the connection admission control design can simply add/subtract the effective bandwidth of a connection from the total allocated bandwidth whenever the connection is admitted or released, without any need to re-compute the effective bandwidth of the existing connections. However, care must be taken when S-VBR and NS-VBR traffic are multiplexed, discussed below.

As indicated above, for real time-variable bit-rate connections, an additional quality of service requirement, the cell delay variations constraint, must also be considered. The effective bandwidth algorithm can be naturally extended to include delay constraint by incorporating it into the effective bandwidth calculation. It is noted that in the calculation of the effective bandwidth the ratio of system resources, B/C, is in fact the maximum delay time for the virtual buffer/trunk systems because of the proportional B/C allocation. Therefore, if the ratio B/C is replaced by $D_{rt}$-VBR, which is the peak-to-peak cell delay variations CDV of a rt-VBR connection, such that:

$$e_0 = \frac{P}{1 + \frac{D_{rt-VBR}}{B_T}(P-r)}$$

then the delay for that connection will be bounded by $D_{rt}$-VBR. With this approach, the effective bandwidth calculation for rt-VBR and nrt-VBR can be unified into a single framework and treated as a single VBR class in the connection admission control implementation.

Allocation of Shared Buffer to Output Ports

According to a feature of the present invention, the Elwalid algorithm is generalized for the shared-memory architecture, to allocate a buffer size value, $B_i$, to an output port, i, for use in the effective bandwidth computation. An impractical optimal policy solves a N+1 constraint problem, i.e., N bandwidth utilization constraints for each of the N output ports plus one constraint for the buffer utilization in the SMF, such that:

$$P_r\left[\sum_j^{J_i} \sum_k^{K_{i,j}} U_{i,j,k}(t) \ge C_i\right] \le CLR_i, \text{ for } i = 1, \ldots, N$$

$$P_r\left[\sum_i^N \sum_j^{J_i} \sum_k^{K_{i,j}} V_{i,j,k}(t) \ge B\right] \le \min\{CLR_i\}$$

The implementation of this optimal allocation policy would be prohibitive, given the tight processing time constraint and the traffic-type oriented implementation, since it requires the buffer to be re-allocated whenever there is a load change at any of the N output ports due to either a CBR or VBR connection setup. In addition, it would require an additional dimension of the look-up table, and whenever the buffer has to be re-allocated, different effective bandwidths for all the existing connections have to re-loaded from the look-up table to re-evaluate the admission region.

Thus, in accordance with a feature of the present invention, the buffer, $B_i$, is statically allocated to each port through provisioning. The selection of $B_i$ for a port has an important effect on the buffer utilization in the SMF 250. To address this problem, a simple system is considered with two output ports of identical link capacity and carrying one single type of VBR traffic. The representative admission regions for these two ports under two different allocation methods of $B_i$'s are illustrated in FIG. 9, where $e_l$ indicates the lossy effective bandwidth with buffering and $e_{bl}$ indicates the lossy effective bandwidth without buffering.

Figure 9:
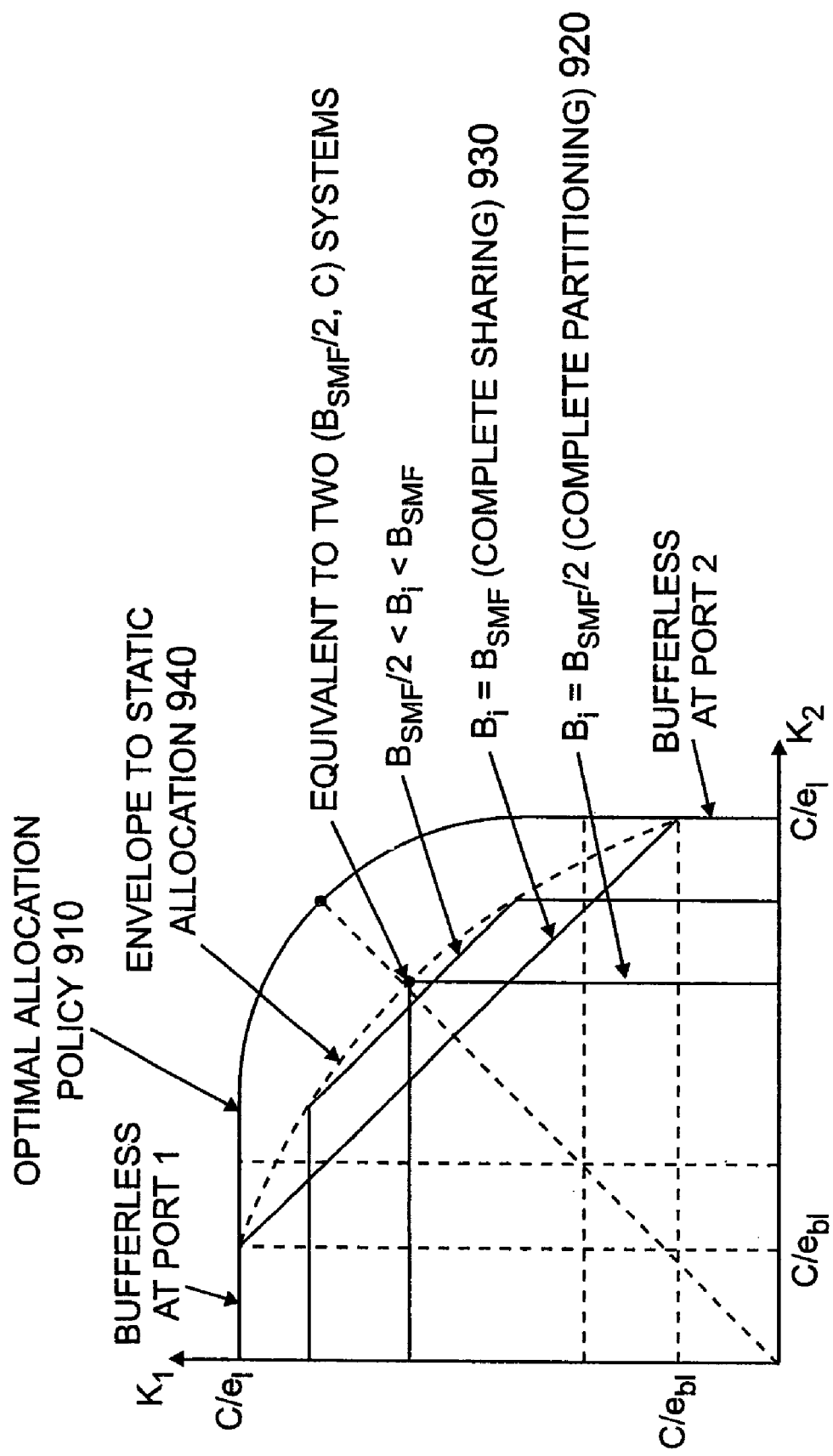
FIG. 9 illustrates the representative admission regions for two ports, i, under two different methods of allocating the buffer space, $B_i$.

The outmost curve 910 in FIG. 9 is a conjectured admission region boundary resulting from the optimal allocation policy. First, when port 1 is fully loaded while port 2 is idle, the maximum number of connections that can be admitted at port 1 is $C/e_l$, and port 1 occupies the whole buffer space. Next, as port 2 loads up, port 2 can admit some number of connections (larger than $C/e_{bl}$, where $e_{bl}$ is the effective bandwidth of the connections in a bufferless system of the same link capacity) without affecting the maximum load at port 1. Then, when the loads of both ports are more balanced, it is easy to show that the boundary should be convex.

The present invention utilizes a static allocation policy to assign a portion of the buffer 250 to each port. In one embodiment, a buffer allocation value for a given port is selected from a range of values, based on the load of the output port. The range has a lower bound that utilizes a complete partitioning approach to evenly divide the SMF buffer space 250 among all the ports such that $$\sum_i B_i = B_{SMF}.$$

This approach, which corresponds to the square 920 in FIG. 9, is simple but conservative, especially when ports are asymmetrically loaded.

In addition, the range has an upper bound that utilizes a complete sharing approach, whereby each port uses $B_{SMF}$ in their computation of effective bandwidths. Similar to the scenario in the optimal allocation case, when port 1 is fully loaded while port 2 is idle, the maximum number of connections that can be admitted at port 1 is $C/e_l$. As shown by plot 930, as port 2 starts to load up, port 2 operates in a bufferless mode and admits up to $C/e_{bl}$ number of connections without affecting the maximum load of port 1. When the loads at both ports are at a similar level, the connection admission control design needs to keep track of the total effective buffer allocated to both ports and ensure that sum does not exceed $B_{SMF}$.

Therefore, for this particular system, the admission region boundary 930 should be linear when both ports operate in buffered mode and the load levels are similar. However, even though all connections have the full use of the SMF buffer, the total utilization can be lower than that by complete partitioning when both ports have similar levels of load. For complete sharing, any single port can potentially occupies the whole SMF 250. Thus, the sum of effective bandwidth on that port reaches the link capacity at the same time. If there are multiple ports competing for the SMF buffer space, however, the buffer constraint in the SMF 250 therefore is reached first, so that each port still has bandwidth but no buffer left.

Thus, the connection admission control design has to be performed on a bufferless basis, generally yielding a smaller statistical multiplexing gain. Therefore, the larger number of ports there are, the more under-utilized the SMF 250 could be. As a compromise, $B_i$ should be chosen between $B_{SMF}$ and $B_{SMF}/N$, where N is the number of output ports. The convex dash line 940 in FIG. 9 shows the trajectory of the vortex of admission region boundaries as $B_i$ varies from $B_{SMF}$ to $B_{SMF}/N$. Thus, values of $B_i$ between $B_{SMF}$ and $B_{SMF}/N$ can result in better utilization when the load levels of the output ports are similar, which is typical in general network operations. Generally, the provisioning of $B_i$'s is a design parameter for network operators, thereby providing flexibility to tune the parameters according to the real system configuration and traffic conditions.

It should be noted that although a port uses $B_i$ in the computation of effective bandwidth, because $\Sigma B_i > B_{SMF}$, a port is not guaranteed to always have the full access to $B_i$ amount of buffer; instead, the SMF buffer 250 is shared among all ports on a per-connection basis as connections are established and released. If each port is allowed to access the SMF buffer 250 indiscriminately, meaning that a request is always granted if the requested amount of resource is available regardless the current state of the SMF buffer 250 utilization and other ports, it is possible that some port may potentially overwhelm other ports in getting buffer resources, causing a fairness problem.

The above two-port system is again used to demonstrate this possibility. Consider a scenario in which most of the connections carried by port 2 demand a larger amount of effective buffer space than those by port 1, and connection requests arrive at both ports at similar rates. Because connections requesting a smaller amount of buffer space is more likely to be admitted, in the long run, a large portion of the SMF buffer 250 is going to be occupied by connections carried by port 1 while port 2 suffers high connection blocking probability. Therefore, a fair resource allocation policy must be in place to regulate the access of all ports to the SMF buffer.

The connection admission control protocol in accordance with the present invention uses a dynamic access policy that uses the dynamic buffer management scheme used in the SMF 250. In this approach, the connection admission control design assigns each output port a provisionable multiplier, $C_i$, and keeps track of the total allocated effective buffer $$\sum_i^N \sum_j^{J_i} \sum_k^{K_{i,j}} b_{l_{i,j,k}}$$

in the SMF 250, where $b_{l_{i,j,k}}$ is the lossy effective bandwidth of traffic type j at port i, that has been allocated to port i. When a new connection request arrives demanding $b_{l_{new}}$ amount of buffer, it is admitted if $$\sum_j^{J_i} \sum_k^{K_{i,j}} b_{l_{i,j,k}} + b_{l_{new}} \leq$$

$$\min\left\{ C_i \left( B_{SMF} - \sum_i^N \sum_j^{J_i} \sum_k^{K_{i,j}} b_{l_{i,j,k}} - b_{l_{new}} \right), B_i \right\}$$

and if other admission conditions are met.

By making the maximum amount of buffer space that each port can possibly occupy a function of the current SMF buffer usage, this policy efficiently distributes the available buffer space to all ports. Quantitatively, it can be shown that given an infinite pool of requests, the amount of buffer a port occupies in steady-state is given by $$\min\left\{ \frac{C_i}{1 + \sum_i^N C_i} B_{SMF}, B_i \right\}.$$

Therefore, by assigning different values to $C_i$, the connection admission control design can either support a max-min type of fairness among ports or prioritize the privilege of individual ports in accessing buffer resource, depending upon facts such as port capacity, connection-request arrival rate and average request-size. In addition, this dynamic access policy, which operates at the connection level, can be easily coupled with the dynamic buffer management algorithm, if present, which operates at the cell level, by using a proportional or comparable set of multipliers. With a consistent framework in buffer management at both connection and cell levels, the SMF buffer utilization is more efficient and achieves better cell loss performance.

It is to be understood that the embodiments and variations shown and described herein are merely illustrative of the principles of this invention and that various modifications may be implemented by those skilled in the art without departing from the scope and spirit of the invention.

We claim:

1. A method for processing a request from a first communications device for a virtual circuit through a network, said network having a plurality of nodes and links, each of said nodes having a plurality of output ports sharing a buffer having a buffer size, B, and each of said links being characterized by a bandwidth capacity, C, said method comprising the steps of:
provisioning a portion, $B_i$, of said buffer to each of said output ports, i, for use in a computation of effective bandwidth;
receiving a signal representing a request for admission of a virtual circuit in said network for conveying data from said first communications device to a second communication device, the requested virtual circuit to be routed through an access regulator and at least one node connected to a corresponding link of said network, wherein data transmission characteristics of said access regulator are represented by a set of parameters;
determining said effective bandwidth and buffer space requirements from said set of parameters, wherein a ratio of said effective buffer space requirement $b_0$ to said allocated buffer size $B_i$ is substantially equal to a ratio of said effective bandwidth requirement to said link bandwidth capacity C; and
admitting said virtual circuit request if said determined bandwidth and buffer space requirements are less than available buffer memory space in said buffer and available link bandwidth capacity in said link.

2. The method of claim 1, wherein said set of parameters representing said transmission characteristics of said access regulator comprise a long term average rate, r, a maximum burst size, $B_T$, and a peak rate, P, and wherein a lossless effective bandwidth requirement $e_0$ satisfies the expression:

$$e_0 = \frac{P}{1 + \frac{B_i}{C}\frac{(P-r)}{B_T}}$$

3. The method of claim 1, wherein a lossy effective bandwidth, $e_l$, is obtained from the expression $C/K_{max}$, where $K_{max}$ is the maximum value of K that satisfies the inequality:

$$P_r\left[\sum_i^K U_i(t) \geq C\right] \leq CLR.$$

4. The method of claim 1, wherein said portion, $B_i$, of said buffer is allocated to each of said output ports, i, by selecting a value from a range bounded by a lower limit that divides the buffer space, B, among all the ports such that $\Sigma_i B_i = B_{SMF}$ and an upper limit that allocates said portion, $B_i$, of said buffer to each of said output ports, i, using a sharing approach where each port uses B in their computation of effective bandwidths.

5. The method of claim 1, wherein a new connection request demanding a buffer size of $b_{l_{new}}$ is admitted if:

$$\sum_j^{J_i}\sum_k^{K_{i,j}} b_{l_{i,j,k}} + b_{l_{new}} \leq \min\left\{C_i\left(B - \sum_i^N\sum_j^{J_i}\sum_k^{K_{i,j}} b_{l_{i,j,k}} - b_{l_{new}}\right), B_i\right\}$$

6. The method of claim 1, wherein said access regulator is a leaky bucket regulator.

7. The method of claim 1, further comprising the step of allocating said effective bandwidth requirement in said link for said admitted virtual circuit.

8. The method of claim 7, wherein a set of n admitted virtual circuits, having respective bandwidth requirements $e_n$ are already routed through said node and wherein the step of admitting comprises the step of:
routing an $n+1^{th}$ requested virtual circuit through said node with respective associated bandwidth requirement $e_{n+1}$ if:

$$\sum_{j=1}^{n+1} e_j \leq C$$

9. The method of claim 1, further comprising the step of allocating said effective buffer space requirement in said node for said admitted virtual circuit.

10. The method of claim 9 wherein a set of n admitted virtual circuits, having respective buffer space requirements $b_n$ are already routed through said node and wherein the step of admitting comprises the step of:
routing an $n+1^{th}$ requested virtual circuit through said node with respective associated buffer space requirement $b_{n+1}$ if $$\sum_{j=1}^{n+1} b_j \leq B.$$

11. A method for processing a request from a first communications device for a virtual circuit through a network, said network having a plurality of nodes and links, each of said nodes having a plurality of output ports sharing a buffer having a buffer size, B, and each of said links being characterized by a bandwidth capacity, C, said method comprising the steps of:
provisioning a portion, $B_i$, of said buffer to each of said output ports, i, for use in a computation of effective bandwidth;
receiving a signal representing a request for a virtual circuit for conveying data from a communication device, the requested virtual circuit to be routed through a node connected to a link, wherein said data arrives at said node at a rate characterized by a set of parameters, said set of parameters including a long term average rate, r, a maximum burst size, $B_T$, and a peak rate, P;

determining said effective bandwidth and buffer space requirements from said set of parameters, wherein a ratio of said effective buffer space requirement $b_0$ to said allocated buffer size $B_i$ is substantially equal to a ratio of said effective bandwidth requirement to said link bandwidth capacity C, obtaining a lossless effective bandwidth requirement, $e_0$, using the expression:

$$e_0 = \frac{P}{1 + \frac{B_i}{C}\frac{(P-r)}{B_T}}; \text{ and}$$

admitting said virtual circuit request if said determined bandwidth and buffer space requirements are less than available buffer memory space in said buffer and available link bandwidth capacity in said link.

12. The method of claim 11, wherein a set of n admitted virtual circuits, having respective bandwidth requirements $e_n$ are already routed through said node and wherein the step of admitting comprises the step of:

routing an n+1$^{th}$ requested virtual circuit through said node with respective bandwidth requirements $e_{n+1}$ if $$\sum_{j=1}^{n+1} e_j \leq C.$$

13. The method of claim 11, wherein said set of parameters characterize a function for controlling said rate of data from said communication device.

14. The method of claim 13, wherein said function is performed by an access regulator.

15. The method of claim 14, wherein said access regulator is a leaky bucket regulator.

16. The method of claim 11, further comprising the step of allocating said effective bandwidth requirement in said link for said admitted virtual circuit.

17. The method of claim 11, further comprising the step of allocating said effective buffer space requirement in said buffer for said admitted virtual circuit.

18. The method of claim 11, wherein a set of n admitted virtual circuits, having respective buffer requirements $b_n$ are already routed through said node and wherein the step of admitting comprises the step of:

routing an n+1$^{th}$ requested virtual circuit through said node with respective buffer size requirement $b_{n+1}$ if:

$$\sum_{j=1}^{n+1} b_j \leq B.$$

19. The method of claim 11, wherein a lossy effective bandwidth, $e_l$, is obtained from the expression $C/K_{max}$, where $K_{max}$ is the maximum value of K that satisfies the inequality:

$$P_r\left[\sum_{i}^{K} U_i(t) \geq C\right] \leq CLR.$$

20. The method of claim 11, wherein said portion, $B_i$, of said buffer is allocated to each of said output ports, i, by selecting a value from a range bounded by a lower limit that divides the buffer space, B, among all the ports such that $\Sigma_i B_i = B_{SMF}$ and an upper limit that allocates said portion, $B_i$, of said buffer to each of said output ports, i, using a sharing approach where each port uses B in their computation of effective bandwidths.

21. The method of claim 11, wherein a new connection request demanding a buffer size of $b_{l_{new}}$ is admitted if:

$$\sum_{j}^{J_i}\sum_{k}^{K_{i,j}} b_{l_{i,j,k}} + b_{l_{new}} \leq \min\left\{C_i\left(B - \sum_{i}^{N}\sum_{j}^{J_i}\sum_{k}^{K_{i,j}} b_{l_{i,j,k}} - b_{l_{new}}\right), B_i\right\}$$

22. A network node, comprising:

at least one input port for receiving a request from a first communications device for a virtual circuit through a network, said network having a plurality of links, each of said links being characterized by a bandwidth capacity, C;

a plurality of output ports sharing a buffer having a buffer size, B;

a memory for storing computer-readable code; and a processor operatively coupled to said memory, said processor configured to execute said computer-readable code, said computer-readable code configuring said processor to:

provision a portion, $B_i$, of said buffer to each of said output ports, i, for use in a computation of effective bandwidth;

receive a signal representing a request for admission of a virtual circuit in said network for conveying data from said first communications device to a second communication device, the requested virtual circuit to be routed through an access regulator and at least one node connected to a corresponding link of said network, wherein data transmission characteristics of said access regulator are represented by a set of parameters;

determine said effective bandwidth and buffer space requirements from said set of parameters, wherein a ratio of said effective buffer space requirement $b_0$ to said allocated buffer size $B_i$ is substantially equal to a ratio of said effective bandwidth requirement to said link bandwidth capacity C; and admit said virtual circuit request if said determined bandwidth and buffer space requirements are less than available buffer memory space in said buffer and available link bandwidth capacity in said link.

23. A network node, comprising:

at least one input port for receiving a request from a first communications device for a virtual circuit through a network, said network having a plurality of links, each of said links being characterized by a bandwidth capacity, C;

a plurality of output ports sharing a buffer having a buffer size, B;

a memory for storing computer-readable code; and a processor operatively coupled to said memory, said processor configured to execute said computer-readable code, said computer-readable code configuring said processor to:

provision a portion, $B_i$, of said buffer to each of said output ports, i, for use in a computation of effective bandwidth;

receive a signal representing a request for a virtual circuit for conveying data from a communication device, the requested virtual circuit to be routed through a node connected to a link, wherein said data arrives at said node at a rate characterized by a set of parameters, said set of parameters including a long term average rate, r, a maximum burst size, $B_T$, and a peak rate, P;

determine said effective bandwidth and buffer space requirements from said set of parameters, wherein a ratio of said effective buffer space requirement $b_0$ to said allocated buffer size $B_i$ is substantially equal to a ratio of said effective bandwidth requirement to said link bandwidth capacity C, obtain a lossless effective bandwidth requirement, $e_0$, using the expression:

$$e_0 = \frac{P}{1 + \frac{B_i}{C}\frac{(P-r)}{B_T}}; \text{ and}$$

admit said virtual circuit request if said determined bandwidth and buffer space requirements are less than available buffer memory space in said buffer and available link bandwidth capacity in said link.

* * * * *